V. LOUGHEED.
STEERING DEVICE FOR MOTOR VEHICLES.
APPLICATION FILED APR. 6, 1917.

1,303,928.

Patented May 20, 1919.

Witness:
R. L. Farrington

Inventor,
Victor Lougheed.
By Hirschl, Hirschl & Brooks.

UNITED STATES PATENT OFFICE.

VICTOR LOUGHEED, OF CHICAGO, ILLINOIS, ASSIGNOR TO WARNER ELECTRIC COMPANY, OF MUNCIE, INDIANA, A CORPORATION.

STEERING DEVICE FOR MOTOR-VEHICLES.

1,303,928.

Specification of Letters Patent. Patented May 20, 1919.

Application filed April 6, 1917. Serial No. 160,252.

*To all whom it may concern:*

Be it known that I, VICTOR LOUGHEED, a citizen of the United States, residing in the city of Chicago, in the county of Cook and State of Illinois, have invented new and useful Improvements in Steering Devices for Motor-Vehicles, of which the following is a specification.

This invention relates to improvements in steering devices for motor vehicles and more especially to improvements in the common form of steering device which includes an upwardly extending steering post or shaft with a hand wheel on its upper end to control the steering wheels of the vehicle. It is well known that for convenience and comfort in driving the steering post is commonly inclined rearwardly at a considerable angle and the steering wheel is brought near the body of the driver, as a result of which the lower rim of the wheel is spaced so close to the front edge of the driver's seat that it is difficult for him to enter and leave it; to adjust lap robes; to reach into his pockets for handkerchiefs, gloves, matches, and the like, especially when burdened with an overcoat or heavy clothing; and otherwise to obtain the freedom of movement desired. Accordingly the present invention relates more particularly to means for tilting or inclining the steering wheel with respect to its normal plane to bring it into a position where its lower rim is raised considerably above the height of the driver's seat whenever more freedom is desired for getting in or out or moving about; the wheel being returned to its original position and securely locked in place when its use is again necessary for properly guiding the vehicle. For this purpose I have devised a wheel tilting device in the form of a member adapted to be interposed between the wheel and the steering post, such member being made in two parts movable relatively to each other and adapted for rigid engagement respectively with the wheel and the post, so that by the relative movement of these two parts the position of the wheel may be varied with respect to the position of the post.

A device embodying the principles of the present invention is illustrated in the accompanying drawings in which.

Figure 1:
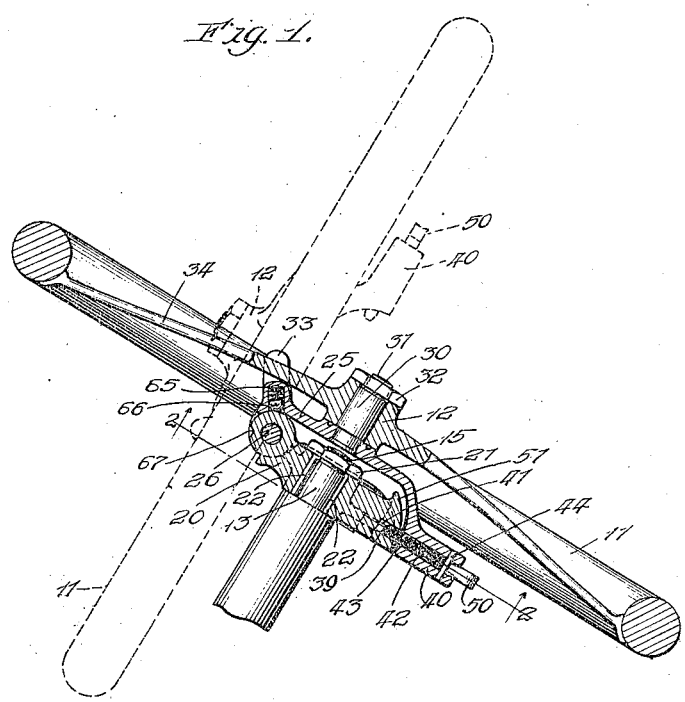
Figure 1 is a view in axial section showing a steering wheel and related parts and my improved wheel tilting device in place.
Figure 2:
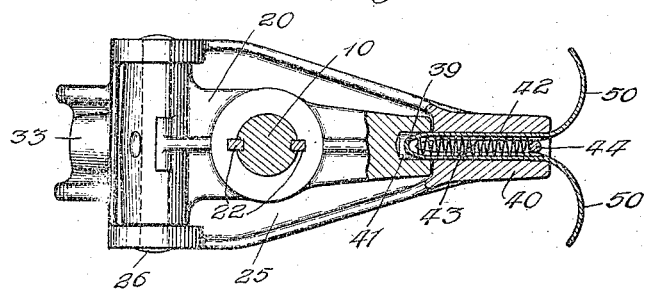
Fig. 2 is a radial section on the line 2—2 of Fig. 1, looking in the direction indicated by the arrows.

As shown in said drawings, a common type of steering gear found in a large number of vehicles at present in use includes a steering post or shaft 10 and a steering wheel 11, the latter having a hub 12 which is ordinarily fixed rigidly upon the upper end of the post or shaft 10. For this purpose the upper end 13 of the shaft 10 is reduced in diameter and the hub 12 is made with a corresponding opening so that the wheel may be fitted down upon the shaft and locked in place by a nut on a projecting threaded end 15 of the shaft; the wheel being fixed against rotation on the end of the shaft by one or more keys or feathers of ordinary form. All of these parts are made in accordance with well known principles and their particular design or construction constitutes no part of the present invention, nor is it essential to the employment of this invention that the parts be made exactly as above described, but without departing from the spirit of this invention the device herein illustrated as embodying a form of it may be adapted for use in connection with a steering post and its related steering wheel employing an equivalent construction and arrangement of parts.

My improved wheel tilting device for use in connection with the parts above described comprises a member made in two parts which are hinged together, one part being in the form of a cross-arm 20 fixed to the upper end of the steering post 10 and the other part 25 being rigidly connected to the hub of the wheel 11, so that by the relative movement of the two parts about their hinged joint the plane of the wheel may be inclined with respect to its normal plane. The cross-arm 20 has its center part considerably enlarged and made with an opening through it corresponding accurately to the form and size of the opening through the wheel hub 12; so that the wheel may be removed from the end of the post and replaced by the cross-arm 20, which latter is then fixed in place by a nut 21 made to fit the threaded end 15 of the steering post, and is locked against rotation on the post by keys 22.

Above and parallel to the cross-arm 20 is another arm 25 having its ends downturned to meet the ends of the first arm, the forward end of the arm 25 being hinged to the adjacent end of the arm 20 by a large hinged joint 26. Extending upward from the center of the arm 25, and over and concentric with the shaft end 13, is a short fixed stud 30 which is made accurately in the same form and of the same size as the reduced end 13 of the shaft 10, and upon this short stud is fixed the hub 12 of the wheel 11; the stud 30 having a threaded end 31 projecting above the wheel hub and engaged by a nut, 32, similar to the nut 21, so that for one of these two nuts there may be used the nut which was originally designed for the end of the shaft 10. The wheel is fixed against rotation on the stud 30 by means of a rigid post 33 extending upward from the part 25, the upper end of this post being notched or forked to engage the two sides of one of the spokes, 34, of the wheel.

When the wheel occupies its normal position with its plane at right angles to the steering post 10 the tilting bracket is latched by a latch bolt 39 which slides in a recess in the rear end 40 of the arm 25 and extends radially inward to engage in an opening in the end of the fixed arm 20, as indicated at 41. As here shown the latching bolt 39 is made with a hollow cylindric shank part 42 in which is arranged a coiled spring 43, the outer end of the spring engaging against a cross pin 44 which extends through slots in the walls of the bolt. The two halves of the projecting rear part of the bolt are flared and curved around in the form of a pair of handles 50 by means of which the bolt may be withdrawn from its engagement in the end of the arm 20 to permit the tilting of the wheel as above described; and when the wheel is moved back into its normal position, the end of the bolt 40 is designed to slide upon an inclined surface 51 above the opening 41 and snap into place without the necessity of withdrawing it through the handles 50, thus again securely locking the wheel in its operative position.

In the hinge joint between the fixed arm 20 and the movable arm 25 is arranged a spring detent made by providing an opening in one of the parts in which is arranged a spring 65 bearing against a small ball 66 to press the same into engagement with a spherical recess 67; so that when the wheel is inclined into its tilted position the ball will snap into place in the recess and support the wheel yieldingly in such position.

I claim as my invention:

1. In a steering device the combination with a steering post and a steering wheel adapted for connection to such steering post, of a member interposed between the wheel and the post, such member being made in two parts movable relatively to each other and adapted for engagement respectively with the post and the hub of the wheel, whereby the relative movement of the said two parts will vary the position of the wheel with respect to the position of the post, and means on the part which engages the wheel hub to engage a spoke of the wheel and prevent rotation of the wheel with respect to such part.

2. The combination with a steering post and a steering wheel having its hub adapted for fixed engagement upon the end of the steering post, of a member interposed between the wheel and the post, said member being made in two parts hinged together and adapted for relative movement, one part having a portion thereof made in the same form as the hub of the wheel and adapted for rigid connection to the end of the steering post, and the other part having a portion made in the same form as the end of the steering post and adapted for rigid connection to the hub of the steering wheel, and a projection on said second part adapted to engage a spoke of the steering wheel and prevent rotation of the wheel with respect to such part.

3. In a steering device the combination with a steering post and a steering wheel adapted for fixed engagement upon the end of the steering post, of a member interposed between the wheel and the post, said member comprising a cross-arm fixed to the end of the steering post, a relatively movable arm hinged to the cross-arm and having a part in fixed engagement with the wheel, means for latching the fixed arm and the hinged arm against relative movement, and means independent of the latching means for yieldingly supporting the wheel in a position out of its normal position.

In witness whereof, I have hereunto subscribed my name this 3rd day of April, 1917.

VICTOR LOUGHEED.